Dec. 13, 1960  V. DEBS  2,964,076
BAND SAW GUIDE AND CLEANER
Filed Aug. 27, 1957  2 Sheets-Sheet 2
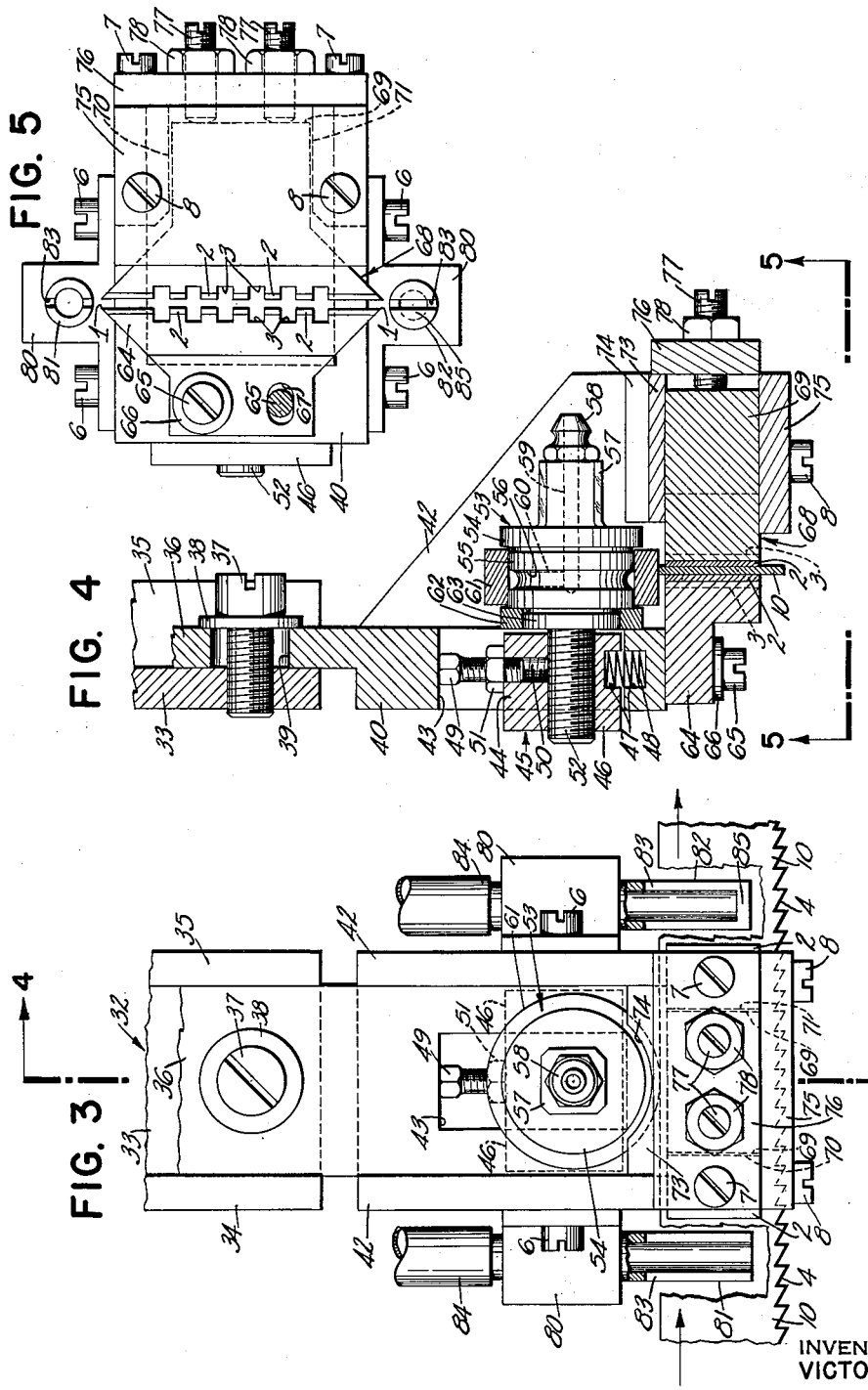
INVENTOR
VICTOR DEBS
BY
ATTORNEY United States Patent Office 2,964,076
Patented Dec. 13, 1960

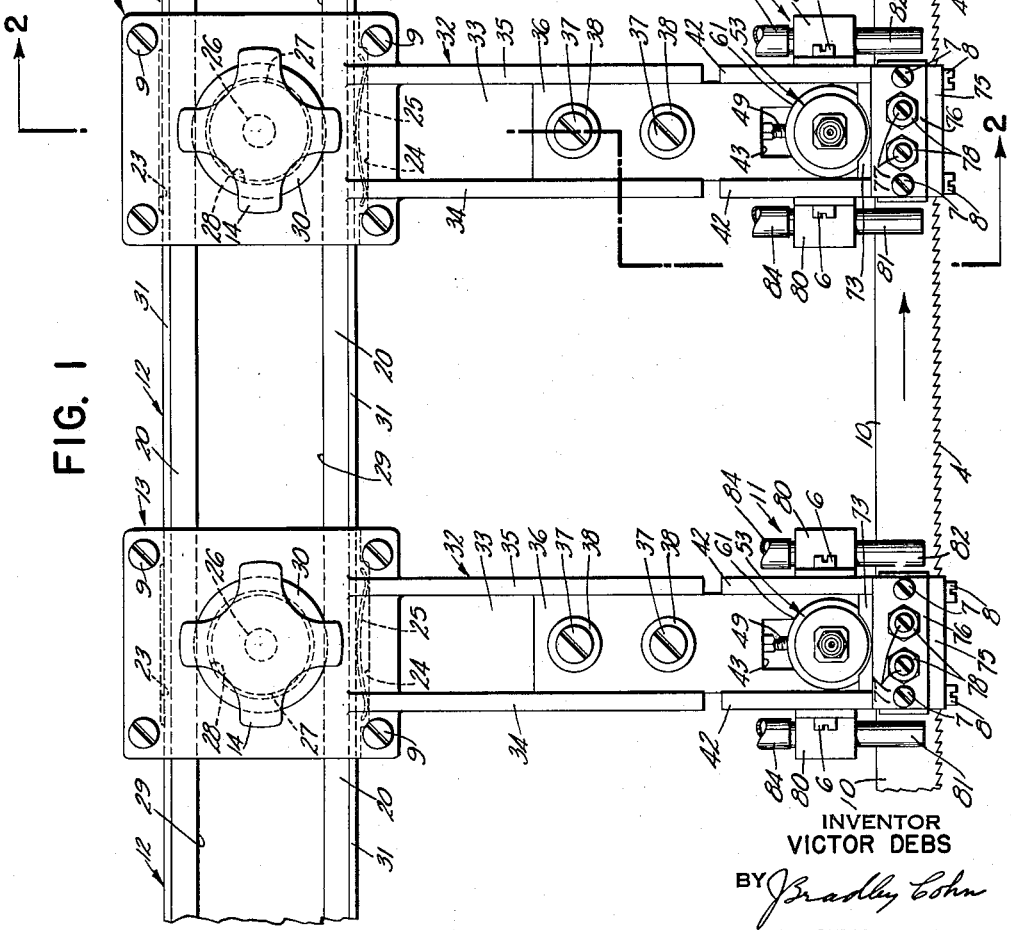

2,964,076

BAND SAW GUIDE AND CLEANER

Victor Debs, Ridgewood, N.Y., assignor to American Machine & Foundry Company, a corporation of New Jersey Filed Aug. 27, 1957, Ser. No. 680,521

9 Claims. (Cl. 143—158)

This invention relates in general to band sawing machines and more particularly to band saw blade guides for such machines.

Band sawing machines of all types have blade guides positioned to hold the blade as close as possible on either side of the work piece being cut to more precisely support the blade and ensure accurate cuts. Horizontal band saws of the general type shown in U.S. Patent No. 1,596,033 have an additional need for such blade guides. These saws have an endless blade placed about two wheels that are disposed in a substantially horizontal plane with their vertical axes tilted forwards towards that portion of the blade that is to cut vertically into the work piece. This forward tilt of the wheels and the blade is to allow a work piece to clear the run of the blade opposite that doing the cutting; however the portion of the blade that is in contact with the work piece is in a vertical position. The blade guide holds the blade horizontally.

An object of this invention is to provide a superior blade guide for band saws that cleans the blade as well as guiding it.

Another object of this invention is to provide blade guides for band saws that more effectively remove foreign matter from the blade before it enters the guide to prevent jamming in the guide to the detriment of the blade and the guide.

Yet another object of this invention is to provide a blade guide for band saws that incorporates internal channels to remove foreign matter which may have entered the guide. It is an object of the invention to provide means to flush such matter from within the guide while still providing support for the blade.

A further object of this invention is to provide a blade guide assembly for horizontal band saws that provides a broader engagement of the blade with a given area of contact to more effectively control the blade.

Still another object of this invention is to provide a blade guide assembly for band saws that allows the more effective application of a coolant to the blade and to the blade guide.

Additional objects, advantages and features of invention reside in the construction, arrangement, and combination of parts involved in the embodiment of the invention and its practice otherwise as will be understood from the following description and accompanying drawings wherein:

Fig. 1 is a detailed front elevation of the blade guide assembly as used in conjunction with a band saw;

Fig. 2 is a sectional end elevation of the same taken on line 2—2 in Fig. 1;

Fig. 3 is an enlarged front elevation partly in section illustrating a single blade guide in detail;

Fig. 4 is a sectional side elevation of the same taken on line 4—4 in Fig. 3; and Fig. 5 is a bottom view of a blade guide taken on line 5—5 of Fig. 4.

Referring to the drawings in detail, Fig. 1 shows the band saw blade 10 passing through the two blade guide assemblies generally designated by the numeral 11. A supporting track 12 has the blade guide assembly supports 13 slidably secured to it in such a manner that the blade guide assemblies may be adjusted by laterally sliding them into position as close as possible on either side of a work piece to be cut and then securing the blade guide assemblies in position by locking the blade guide supports to the supporting track by the turning of the hand wheels 14.

Fig. 2 shows in greater detail the mounting of the blade guide supports 13 on the supporting track 12. A narrower rear portion 15 of the supporting track may be secured to a suitable member 16 of a horizontal band sawing machine without interfering with the sliding action of the blade guide assembly supports. A flat head bolt 18 and the nut 19 secure the supporting track to this member. The wider forward portion 20 of the track has the blade guide assembly support 13 secured to its front face by means of the upper track riding member 21 and the lower track riding member 22. The central portion 23 of the upper track riding member is cut away so that this member will make a precise two point sliding contact with the top surface of the supporting track. The central portion 24 of the lower track riding member that is disposed adjacent to the lower surface of the supporting track is cut away to hold the bowed leaf spring 25 which acts as a compression spring. This spring urges the blade guide assembly supports downward to ensure their alignment as the upper track riding member is forced against the upper part of the supporting track.

The hand wheel 14, which is secured to the threaded shaft 26 by means of the set screw 17, may be turned to move the threaded shaft inwards into the blade guide assembly support 13. This threaded shaft then forces the locking disk 27 outward from its recess 28 against the face of the supporting track within the wide shallow groove 29. Because the upper and lower track riding members extend behind the wider forward portion of the supporting track, the locking disk then clamps the blade guide assembly support to the supporting track. The boss 30 is formed on each blade guide assembly support to strengthen it. The bevels 31 are formed on the edges of the wider portion 20 of the supporting track so that precise sliding contact is only made on the proper surfaces. The lower extension 32 of the blade guide assembly support is a channel shaped member with a rear wall 33 and the side flanges 34 and 35. Disposed in front of this rear wall between the side flanges is the securing member 36 of the blade guide assembly which is held to the rear wall by means of the bolts 37 and the washers 38. The apertures 39 in the securing member through which the bolts pass to be turned into the rear wall are enlarged to allow some vertical adjustment of the securing member 36 relative to the lower extension of the blade guide assembly support member.

Referring now to Fig. 3 and Fig. 4, each blade guide assembly 11 is supported by the securing member 36 provided with thicker back portion 40 and a blade guide supporting bracket 42 integral therewith. This thicker back portion 40 contains the rectangular aperture 43 within which is slidably disposed the body portion 44 of the vertical slide 45. The rear portion of the vertical slide 45 is provided with a pair of extending lugs 46 engaging with the rear face of member 36 bridging the rectangular aperture 43. In a small recess 47 formed in the lower portion of the body portion 44 and in the adjacent bottom wall of the rectangular aperture there is disposed the small helical compression spring 48. The compression spring urges the vertical slide upwards until it is checked by the threaded adjustable stop 49 which is held in the threaded bore 50 and locked by means of a lock nut 51. Cooperatively engaged in a threaded bore of slide 45 is the threaded extension 52 of the roller mounting arbor 53. This roller mounting arbor consists of a large diameter section 54 disposed beyond the roller seat surface 55 which contains the circumferential lubricating groove 56. Fastened to the end of the projection 57 is the lubricating fitting 58 that communicates with the circumferential lubricating groove by means of the passages 59 and 60 to allow a lubricant to be forced from the fitting through the passages to the under surface of the roller 61. A roller check washer 62 is disposed about a smaller diameter portion 63 of the roller mounting arbor so that the entire roller mounting arbor with the roller in place can be turned into the vertical slide 45 until the roller check washer engages with the front face of securing member 36. In this position the roller and the roller mounting arbor are firmly fixed to the thicker back portion by means of the vertical slide. The roller, however, may be vertically adjusted to hold the saw blade 10 at the proper height by turning the threaded adjusting stop into or out of the channel 50 to allow the roller to be raised by the compression spring 48 or to force the roller downward to compress the compression spring.

Referring to Fig. 4 and Fig. 5, the rear blade contacting element 64 is secured directly to the bottom surface of the thicker back portion 40 by means of the machine screws 65 and the washers 66. As shown in Fig. 5, the apertures 67 within which the machine screws are disposed are elongated to allow some adjustment or alignment of the rear blade contacting element relative to the blade 10.

As shown in Figs. 3, 4, and 5, the forward blade guide element 68 has a projection 69 which is disposed between a pair of guide lugs 70 and 71 of the blade guide supporting bracket 42 which is an integral portion of member 36. Bracket 42 is also provided with a cross member 73 having a groove 74 which allows the roller mounting arbor to be directly removed from the vertical slide.

A bottom plate 75 provided for the purpose of slidably supporting the guide member 68 is secured to bracket 42 by means of the screws 8. A front plate 76 secured by screws 7 to the outwardly disposed surface of the bracket 42 carries a pair of threaded adjusting screws 77 contacting the rectangular projection 69 of the forward blade guide element 68 and thus provides means of adjusting said element towards or away from the saw blade 10. The screws 77 may be locked in position by means of the lock nuts 78.

As shown in Fig. 2, bracket 42 is provided with a suitable cutout 79 to provide necessary clearance for the saw blade 10. To the side walls of bracket 42 by means of screws 6 are adjustably secured a pair of supporting members 80 each of which carries a jet nozzle 81 and 82 respectively. Each jet nozzle 81 and 82 is provided with a vertical slot 83 arranged in such a manner that each nozzle straddles the saw blade 10 passing through the same, so that any coolant or lubricant delivered to said nozzles by means of suitable tubings 84 contacts both sides of the passing saw blade.

Both nozzles 81 and 82 are of similar construction with the exception that nozzle 81 is open at its bottom end, while nozzle 82 at its bottom end is provided with a wall portion 85. Any coolant and/or lubricant delivered to and ejected from nozzle 81 tends to flow downward over the sides of the passing saw blade and effects a flushing and cleaning of the saw teeth from any drips or foreign particle which may be carried by the same. However, the coolant and/or lubricant delivered to the bottom walled nozzle 82 conserves the flow and affects no flushing, but a lubricating action on the passing saw blade before it bites into the material to be cut. For this reason the leading nozzles, with respect to the direction of travel of the saw blade is desirably of the open type 81 as shown in Figs. 1, 2 and 3 so that the blade is clean before it is lubricated by the second nozzle 82.

Referring now to Fig. 4 and Fig. 5, the forward and rear blade contacting elements embody several unique features. The point of entry 1 of the blade between the blade contacting elements forms, at the most, a right angle with the blade and preferably forms a forward pointing apex which is an acute angle. This apex cannot wedge particles between itself and the blade as do some conventional band saw blade guides in which the point of entry forms an obtuse angle. This apex throws foreign matter from the sides of the blade to clean it. A number of vertical channels 3 are cut straight into the face of the blade contacting elements so that any foreign matter that may be carried on the blade past the point of entry 1 of the blade between the blade contacting elements will tend to be scraped from the blade by the edges of these channels. This material will be deposited in the channels along with coolant that adheres to the blade so that the downward flow of coolant within the channels will flush such foreign matter out of the blade contacting elements. This flushing action makes these blade guides self cleaning. Although the channels are shown as vertical, they may be inclined to some degree if it is considered desirable.

Since the vertical channels reduce the area of the surfaces of the blade contacting elements that actually touch the blade, a given area of blade contact is thereby extended further along the blade which results in a better cooling action, reduced generation of heat due to friction, and lessened wear. This extension of contact along the blade also permits greater control of the blade which increases the accuracy of cutting. In addition, further wear resistance is obtained by means of the linings 2 which are fixed to the face of each blade contacting element to increase its life.

The blade guide assembly supports and the blade guide assemblies are particularly designed to enable any of their component parts to be easily removed and replaced in the event of breakage. In addition, these parts are designed to enable the roller to be rapidly and accurately adjusted to hold the blade at the proper height between the blade contacting elements which are adjusted to press as close to the sides of the saw blade as is necessary to guide and clean it. The jets, which may be moved up and down within their brackets when the bracket mounting screws 6 are loosened, are easily adjusted to properly straddle the blade. The particular arrangement in the path of the blade of an open bottom jet just before each blade guide and a closed bottom jet just after each blade guide allows the maximum efficiency in the distribution of a fluid to the blade for cleaning, lubricating, and cooling purposes.

While I have disclosed my invention with particularity in the best form known to me, it will nevertheless be understood that this is purely exemplary and that modifications in the construction, arrangement, and combination of parts, substitution of materials and substitution of equivalents mechanically and otherwise, may be made without departing from the spirit of the invention, except as it may be more particularly limited in the appended claims wherein I claim:

1. In combination with a horizontal band saw and the moving blade of said band saw, a blade guide assembly to guide that portion of said saw blade cutting a work piece, said blade guide assembly comprising two blade contacting elements with each of said blade contacting elements having a flat surface adapted to be held against the sides of said blade and having solely substantially vertical grooves formed in the flat surfaces, means to hold said blade downward at least partly between said blade contacting elements, and means for depositing a fluid on said blade as it enters said blade guide assembly so that foreign matter scraped from the sides of said blade by the edges of the grooves will be flushed from the grooves by said fluid as it is deposited in the grooves by said moving blade.

2. In combination with a horizontal band saw and the moving blade of said band saw, a blade guide assembly for guiding that portion of said blade cutting a work piece, said blade guide assembly comprising a first blade contacting element having a flat surface with vertical channels formed in it and with the forwardly disposed end of the flat surface forming an apex, a second blade contacting element adapted to be adjustably moved toward said first blade contacting element and having a flat surface with vertical channels formed in it and with the forwardly disposed end of the flat surface forming an apex, said blade contacting elements being disposed on different sides of the blade whereby said forwardly disposed ends are effective to remove foreign particles from said blade as it enters said blade guide assembly, the edges of said vertical channels being effective to scrape from the sides of said blades foreign particles which pass by said forwardly disposed ends, means to hold the blade downwardly at least partly between the flat surfaces of said blade contacting elements, a first nozzle straddling the blade as it enters said blade assembly for applying a stream of fluid to said blade so that fluid flowing past the teeth of said blade from said first nozzle flushes foreign particles from the teeth, fluid deposited upon said blade being effective to flush foreign particles from said vertical channels, and a second nozzle having a bottom member straddling said blade as it leaves said blade guide assembly for depositing additional quantities of fluid on said blade.

3. The combination according to claim 2 wherein said means to hold said blade downward comprises a vertically adjustable roller to ride on the top surface of said blade to hold said blade downward at least partly between the flat surfaces of said blade contacting elements.

4. A blade guide element for guiding and cleaning a band saw blade, comprising a longitudinally extending surface adapted to contact one side of the blade, said guide element having a leading edge provided with a face intersecting said surface to form an acute angle pointing generally in a direction opposite to the direction of movement of the blade and operative to scrape foreign particles from the surface of the blade, and said surface having a plurality of grooves extending only in a direction substantially transverse to the direction of travel of the blade and operative to remove from the blade foreign particles which pass beyond said leading edge.

5. A blade guide assembly for guiding and cleaning a band saw blade, comprising: a pair of blade guide elements adapted to be disposed on opposite sides of the blade; each of said elements having a longitudinal blade contacting surface, a leading edge provided with an outer face intersecting said surface at an acute angle for scraping foreign particles from the blade, and a plurality of substantially transverse grooves extending across said surface for removing from the blade foreign particles which pass by said leading edge, the walls of each of said grooves being continuous and unbroken; and a nozzle operatively supported for applying a coolant jet to the blade before in enters said guide element whereby said coolant jet flushes foreign particles from said grooves.

6. The device substantially as set forth in claim 5 including a nozzle positioned to apply a coolant jet to the blade as it emerges from said guides.

7. The device substantially as set forth in claim 5 wherein said nozzle is provided with a tubular body portion having a diametrical slot through which the blade passes and with an open end through which coolant flows for flushing particles from the blade teeth.

8. A device in accordance with claim 5 including means for holding down the blade as it passes between said blade guide elements.

9. In combination with a horizontal band saw and the moving blade of said band saw, two blade guide assemblies slidably mounted to be positioned one on either side of that portion of said blade cutting a work piece, each of said blade guide assemblies comprising a first blade contacting element having a flat surface with vertical channels formed in it and with the forwardly disposed end of the flat surface forming an apex, a second blade contacting element adapted to be adjustably moved toward said first blade contacting element and having a flat surface with vertical channels formed in it and with the forwardly disposed end of the flat surface forming an apex, each of said blade contacting elements disposed on a different side of said blade whereby said forwardly disposed ends scrape foreign particles from the sides of said blade as it enters said blade guide assemblies, the edges of said vertical channels effective to scrape from the sides of said blade foreign particles which pass by said forwardly disposed ends, means to hold said blade downwardly at least partly between the flat surfaces of said blade contacting elements, jet nozzle means straddling said blade as it enters each of said blade guide assemblies for depositing fluid on said blade and for flushing foreign particles from the teeth of said blade, the fluid deposited on said blade effective to flush foreign particles from said channels, and second jet nozzle means having a bottom member straddling said blade as it leaves said blade guide assemblies for depositing additional quantities of fluid on said blade.

References Cited in the file of this patent

UNITED STATES PATENTS

| | | |
|---|---|---|
| 327,574 | Miller | Oct. 6, 1885 |
| 459,600 | Striegel | Sept. 15, 1891 |
| 495,830 | Pake | Apr. 18, 1893 |
| 1,596,033 | Thompson et al. | Aug. 17, 1926 |
| 1,643,829 | Biro | Sept. 27, 1927 |
| 1,861,412 | Oliver | May 31, 1932 |
| 1,908,727 | Bleam | May 16, 1933 |
| 2,684,697 | Ferrari | July 27, 1954 |
| 2,705,510 | Stocke | Apr. 5, 1955 |
| 2,815,562 | Wilkie et al. | Dec. 10, 1957 |